United States Patent
Brückner et al.

(10) Patent No.: US 8,959,915 B2
(45) Date of Patent: Feb. 24, 2015

(54) WASTE HEAT STEAM GENERATOR

(75) Inventors: Jan Brückner, Uttenreuth (DE); Frank Thomas, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 37 days.

(21) Appl. No.: 13/822,429

(22) PCT Filed: Sep. 2, 2011

(86) PCT No.: PCT/EP2011/065176
§ 371 (c)(1),
(2), (4) Date: Mar. 12, 2013

(87) PCT Pub. No.: WO2012/034870
PCT Pub. Date: Mar. 22, 2012

(65) Prior Publication Data
US 2013/0167533 A1    Jul. 4, 2013

(30) Foreign Application Priority Data
Sep. 13, 2010 (DE) .......................... 10 2010 040 624

(51) Int. Cl.
*F01K 13/02* (2006.01)
*F22D 1/00* (2006.01)
*F01K 21/00* (2006.01)
*F01K 23/10* (2006.01)
*F22G 5/12* (2006.01)

(52) U.S. Cl.
CPC ................ *F01K 21/00* (2013.01); *F01K 23/101* (2013.01); *F22G 5/12* (2013.01); *Y02E 20/16* (2013.01)

USPC .................. 60/646; 60/653; 60/660; 60/670; 122/7 R; 122/460; 122/468

(58) Field of Classification Search
USPC ...................... 60/645–681; 122/7 R, 460, 468
See application file for complete search history.

(56) References Cited

U.S. PATENT DOCUMENTS

| | | | |
|---|---|---|---|
| 6,766,646 B1 | 7/2004 | Ford | |
| 2004/0148934 A1* | 8/2004 | Pinkerton et al. | 60/646 |
| 2006/0178762 A1* | 8/2006 | Wroblewski et al. | 700/30 |

FOREIGN PATENT DOCUMENTS

| | | |
|---|---|---|
| DE | 1177170 B | 9/1964 |
| DE | 102010060064 A1 | 5/2011 |
| EP | 0911504 A1 | 4/1999 |
| EP | 2034137 A1 | 3/2009 |
| EP | 2172622 A2 | 4/2010 |
| EP | 2224164 A1 | 9/2010 |
| GB | 741984 A | 12/1955 |

* cited by examiner

*Primary Examiner* — Hoang Nguyen

(57) ABSTRACT

A waste heat steam generator for a gas and steam turbine power plant is provided. The generator has economizer, evaporator and superheater heating surfaces which form a flow path and through which a flow medium flows. An overflow line branches off from the flow path and leads to injection valves arranged downstream at a flow side of a superheater heating surface in the flow path. The overflow line permits a brief power increase of a downstream steam turbine without resulting in an excessive loss in efficiency of the steam process. The brief power increase is permitted independently of the type of waste heat steam generator. The branch location of the overflow line is arranged upstream of an evaporator heating surface at the flow medium side and downstream of an economizer heating surface.

4 Claims, 1 Drawing Sheet

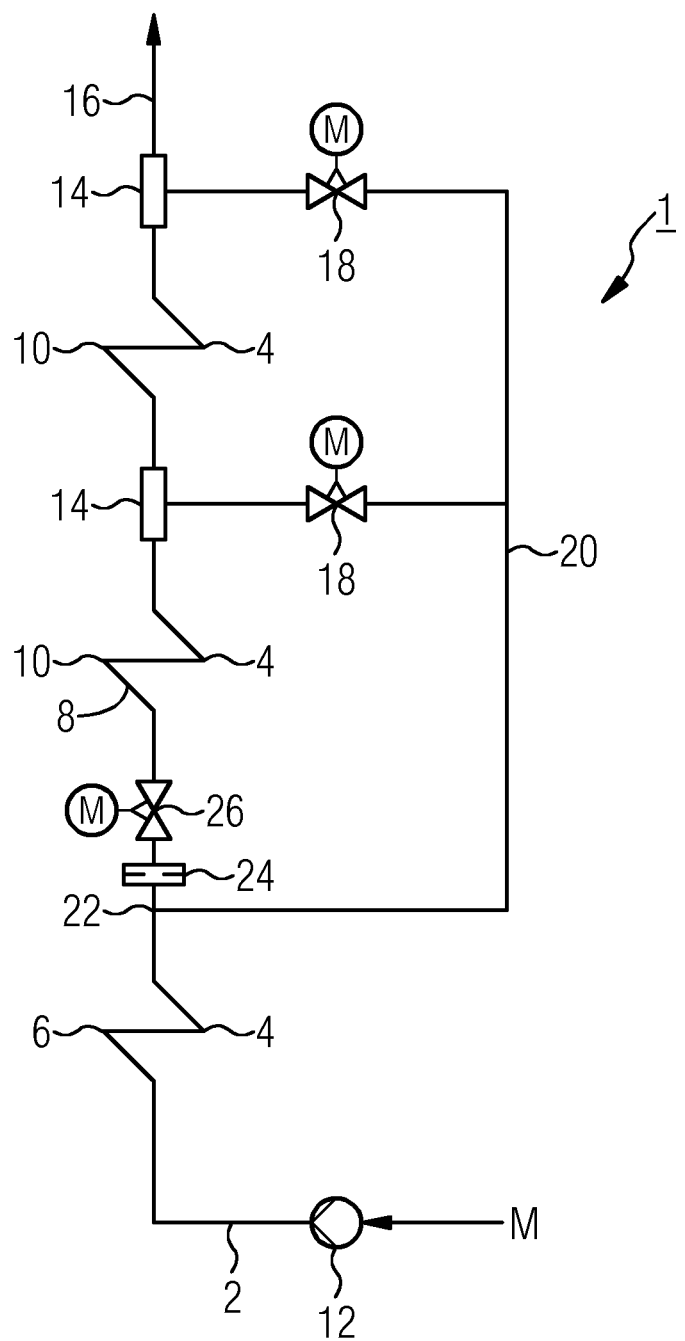

WASTE HEAT STEAM GENERATOR

CROSS REFERENCE TO RELATED APPLICATIONS

This application is the US National Stage of International Application No. PCT/EP2011/065176 filed Sep. 2, 2011 and claims the benefit thereof. The International Application claims the benefits of German application No. 10 2010 040 624.4 filed Sep. 13, 2010, both of the applications are incorporated by reference herein in their entirety.

FIELD OF THE INVENTION

The invention relates to a waste heat steam generator for a combined cycle gas and steam turbine power plant with a number of economizer, evaporator and superheater heating surfaces forming a flow path through which a flow medium flows, in which an overflow line branches off from the flow path and leads to a number of injection valves disposed downstream of a superheater heating surface in the flow path. It further relates to a method for regulating a short-term power increase of a steam turbine with an upstream waste heat steam generator.

BACKGROUND OF THE INVENTION

A waste heat steam generator is a heat exchanger which recovers heat from a hot gas flow. Waste heat steam generators are frequently used in combined cycle power plants which predominantly serve to generate electricity. In such cases a modern combined cycle power plant usually comprises between one and four gas turbine and at least one steam turbine, with each turbine either driving a generator (multi-shaft plant) or a gas turbine with the steam turbine on a common shaft driving a single generator (single-shaft plant). The hot exhaust gases of the gas turbine are used in such plants in a waste heat steam generator for generating water steam. The steam is subsequently supplied to the steam turbine. Usually around two thirds of the electrical power is allocated to the gas turbine and a third to the steam process.

Like the various pressure stages of a steam turbine, the waste heat steam generator also comprises a plurality of pressure stages with different thermal states of the water-steam mixture contained therein in each case. In each of these pressure stages the flow medium on its flow path initially passes through economizers, which use the residual heat for preheating the flow medium and subsequently different stages of evaporator and superheater heating surfaces. In the evaporator the flow medium is evaporated, thereafter possible residual moisture is separated off in a separation device and the steam left behind is heated up further in the superheater.

Because of fluctuations in load the heat power transferred to the superheater can be heavily influenced. Therefore it is frequently necessary to regulate the superheating temperature. With new plants this is mostly achieved by an injection of feed water between the superheating surface for cooling, i.e. an overflow line branches from the main flow of the flow medium and leads to injection valves disposed there accordingly. The injection is regulated in this case via the exit temperatures at the respective superheaters.

Modern power plants not only demand high levels of efficiency but also a method of operation that is as flexible as possible. As well as short startup times and high load change speeds, these also include the option of compensating for frequency faults in the electricity grid. In order to fulfill these requirements the power plant must be able to provide additional power of for example 5% and more within a few seconds.

This is realized in previous usual combined cycle power plants by a load increase of the gas turbines. Under certain circumstances it can however be possible in the upper load range that the desired power increase is not able to be exclusively provided by the gas turbines. Therefore in the interim solutions have also been pursued in which the steam turbine can and should also make an additional contribution to frequency support in the first seconds.

This can be done for example by opening partly throttled turbine valves of the steam turbine or what is referred to as a step valve, which reduce the steam pressure of the steam turbine. Steam from the boiler of the upstream waste heat steam generator is released by this process and supplied to the steam turbine. With this measure a power increase in the steam part of the combined cycle power plant is achieved within a few seconds.

This additional power can be released in a relatively short time, so that the delayed power increase by the gas turbines (restricted by a maximum load change speed resulting from mechanical and operational conditions) can be compensated for at least partly. The entire block immediately makes a jump in performance through this measure and can through a subsequent increase in power of the gas turbine also maintain this performance level permanently or exceed it, provided the plant was in part load mode at the time that the additional power reserves were requested.

A permanent throttling of the turbine valves to maintain a reserve however always leads to a loss of efficiency, so that to drive the system cost effectively the degree of throttling should be kept as low as is absolutely necessary. In addition a number of designs of waste heat steam generators, for example once-through steam generators under some circumstances demand a significantly lower boiler volume than for example natural boiler steam generators. The difference in the size of the reservoir has an influence in the method described above on the behavior during changes in power of the steam part of the combined cycle power plant.

SUMMARY OF THE INVENTION

The object of the invention is therefore to specify a waste heat steam generator of the type described above which is specifically able to make possible a short-term power increase of the downstream steam turbine, without this disproportionately adversely affecting the efficiency of the steam process. At the same time the short-term power increase is to be made possible regardless of the design of the waste heat steam generator. It is also an object of the invention to specify a corresponding combined cycle power plant as well as a method for regulating a short-term power increase of the steam turbine with an upstream waste heat steam generator.

With regard to the waste heat steam generator this object is inventively achieved by the branching-off point of the overflow line being disposed upstream of the first evaporator heating surface on the flow medium side and on the flow medium side downstream of an economizer heating surface.

In this case the invention is based on the idea that additional injection of feed water can make a further contribution to rapid performance change. By additional injection water in the area of the superheater the steam mass flow can namely be briefly increased. Too great an injection volume however under some circumstances reduces the temperature of the steam too greatly. This is to be counteracted by the specific enthalpy of the injection water being increased, since in this way a higher injection volume with the same steam temperature setpoint value is possible. Such an increase of the specific enthalpy of the injection water is able to be achieved by said water experiencing an additional heat input through economizer heat surfaces. This means the overflow line for the injection water should lie downstream of an economizer heating surface on the flow medium side.

This type of tapping off downstream of the economizer heating surface already represents an improvement in respect of the optimization of the injection system to provide an immediate reserve. However the steam mass flow can be increased even further while keeping the steam temperature the same, the higher the specific enthalpy of the injection water is. This is able to be achieved by a further preheating of the injection water. Therefore advantageously the branching-off point of the overflow line should be disposed on the flow medium side downstream of the last economizer heating surface.

By displacing the branching-off point in the direction of the evaporator however the flow side distance between tapping off and injection point reduces. It is therefore to be ensured between entry into and exit from the overflow line that the pressure difference is sufficiently large so that a satisfactory throughput of injection water through the injection valve can be ensured. In an advantageous embodiment a throughflow regulation valve for the flow medium is therefore disposed on the flow medium side downstream of the branching-off point. Through this valve the pressure at the branching-off point is increased and a sufficient pressure difference for all operating situations can be ensured. In any event the economizers are to be designed for the corresponding higher operating pressure.

In a further advantageous embodiment a throughflow measurement device for the flow medium is to be disposed downstream of the branching-off point of the overflow line. The amount tapped off does not then have to be taken into account namely under these circumstances by a measurement or separate balancing for feed water regulation.

In an advantageous embodiment this type of waste heat steam generator is used in a combined cycle power plant.

As regards a method for regulating a short-term power increase of a steam turbine with an upstream waste heat generator with a number of economizer, evaporator and superheater heating surfaces forming a flow path through which a flow medium flows, in which the flow medium branches off from the flow path and is injected on the flow medium side downstream of a superheater heating surface into the flow path, the object is achieved by the flow medium being branched off upstream of the flow medium side first evaporator heating surface and on the flow medium side downstream of an economizer heating surface.

The advantages obtained with the invention particularly consist of enabling a greater increase in the steam turbine power released to be obtained by the tapping off of injection water for a superheater downstream of a first economizer heating surface while using the injection for frequency support. Higher temperatures/enthalpies of the injection water namely result in a larger injection amount, provided the steam temperature nominal value remains the same. This greater injection amount simultaneously increases the fresh steam mass flow which flows through the steam turbine.

If a throttling of the turbine valves is realized in parallel, the degree of throttling can be reduced under these circumstances and despite this the required power increase can be generated. Thus the combined cycle power plant in normal load operation (in which it must be available for an immediate reserve) can be operated with a comparatively higher efficiency as a result of the lower throttling.

The fact that in normal operation in particular a once-through waste heat steam generator with BENSON evaporator manages in the entire load range in normal circumstances without injection into the superheater (likewise for a possible efficiency increase), means that, because of system conditions greater enthalpy of the injection water does not cause any additional negative accompanying phenomena. That means that for normal plant operation the point at which the injection water is tapped off is of no significance.

BRIEF DESCRIPTION OF THE DRAWINGS

An exemplary embodiment of the invention will be explained in greater detail on the basis of a drawing. In this the FIGURE shows on the flow side the high-pressure part of a waste heat steam generator with the components of the injection system connected in accordance with the invention.

DETAILED DESCRIPTION OF THE INVENTION

The high-pressure part of the waste heat steam generator 1 is shown by way of example in the FIGURE. The invention can naturally also be used in other pressure stages. The FIGURE schematically shows the flow path 2 of the flow medium M. The spatial arrangement of the individual heating surfaces 4 of the economizer 6, the evaporator 8 and the superheater 10 in the hot gas duct is not shown and can vary.

The flow medium M is conveyed by the feed pump 12 at the corresponding pressure into the high-pressure flow path 2 of the waste heat steam generator 1. In this case the flow medium M initially flows through an economizer 6, which can comprise a plurality of heating surfaces 4. The economizer 6 is typically disposed in the coldest part of the hot gas duct in order to achieve an increase in the efficiency by using residual heat there. Subsequently the flow medium M passes through the heating surfaces 4 of the evaporator 8 and of the superheater 10. A separation device not shown in any greater detail can be disposed in such cases between the evaporator 8 and the superheater 10, which removes the residual moisture from the flow medium M, so that only pure steam reaches the superheater 10. From the superheater 10 the flow medium M finally flows to the downstream steam turbine not shown in the FIGURE.

The heating surfaces 4 shown in the FIGURE each represent a plurality of serially connected heating surfaces which are not shown differentiated however for reasons of clarity.

Disposed between individual heating surfaces 4 of the superheater 10 on the flow medium side is an injection valve 14, a further injection valve 14 is disposed after the last heating surface 4 of the superheater 10. Here cooler and unevaporated flow medium M can be injected for regulating the exit temperature at the exit 16 of the high-pressure part of the waste heat steam generator 1. The quantity of flow medium M introduced into the injection valve 14 for intermediate or final injection is regulated by a regulation valve 18. The flow medium M in this case is supplied via an overflow line 20 branching off upstream in the flow path 2.

However to enable the injection system to be used not only for regulating the outlet temperature, but also for providing an immediate power reserve, the branching-off point 22 of the overflow line 20 is disposed between the heating surfaces 4 of the evaporator 8 and the heating surfaces 4 of the economizer 6. Thus the flow medium M injected through the injection valves 14 has a significantly higher specific enthalpy than when it is tapped off upstream of the economizer 6 and for the same nominal temperature at the exit 16 a greater volume can be injected. Through this the volume of steam is significantly increased while the temperature actually sinks, but can however be held by using storage effects briefly at a comparatively higher level. Thus the power of the downstream steam turbine is increased.

In the exemplary embodiment in accordance with the FIGURE the flow medium M passes through all heating surfaces 4 of the economizer 6 before a part is removed at the branching-off point 22. Should a removal not be possible at this point, a removal between two heating surfaces 4 of the economizer 6 also represents an improvement in respect of optimization for the immediate reserve, since here too, by comparison with the entry of the economizer 6 there is already a greater enthalpy of the flow medium present.

Disposed in the flow path 2 after the branching-off point 22 of the overflow line 28 are a throughflow measurement device 24 as well is the throughflow regulation valve 26 for the flow path. This means that at the branching-off point 22 of the overflow line 20 high-pressure from the injection pump 12 obtains so that a sufficiently high pressure difference is guaranteed between entry and exit of the overflow line to make possible a sufficiently increased throughflow for the additional power release. The economizer 6 is mechanically designed accordingly for such high pressure.

The arrangement of the throughflow measurement device 24 downstream of the branching-off point 22 allows the throughflow to be measured without taking account of the quantity withdrawn through the overflow line 20. This would otherwise have to be taken into account by an additional measurement or a separate balancing.

A waste heat steam generator 1 designed in this way is now used in a combined cycle power plant. Here the hot waste gases of one or more gas turbines are guided on the flue gas side through the waste heat steam generator, which thus provide steam for the steam turbine. The steam turbine in this case comprises a number of pressure stages, i.e. the steam heated up by the high-pressure part of the waste heat steam generator 1 and expanded in the first stage (high-pressure stage) of the steam turbine is routed into a medium pressure stage of the waste heat steam generator 1 and is superheated there again, however to a lower pressure level. As already mentioned the exemplary embodiment in accordance with the FIGURE shows the high-pressure part of the waste heat steam generator 1 to illustrate the invention by way of example, this can however also be employed in other pressure stages.

A combined cycle power plant equipped with such a waste heat steam generator is able not only to provide a short-term power increase of the gas turbine which is restricted by the allowed maximum load change speed, but also to rapidly provide a power increase via an immediate power release of the steam turbine, which serves to support the frequency of the electricity grid.

The fact that this power reserve is achieved by a double use of the injection valves as well as the usual temperature regulation also enables a permanent throttling of the steam turbine in order to provide a reserve to be reduced or dispensed with entirely, through which an especially high level of efficiency during normal operation is achieved.

The invention claimed is:

1. A waste heat steam generator for a combined cycle power plant, comprising:
    a plurality of economizer heating surfaces, evaporator heating surfaces, and superheater heating surfaces that form a flow path through which a flow medium flows; and
    an overflow line that branches off from the flow path and leads to an injection valve disposed in the flow path on a flow medium side downstream of the superheater heating surface,
    wherein a branching-off point of the overflow line is disposed on the flow medium side upstream of an evaporator heating surface and downstream of an economizer heating surface,
    wherein the branching-off point of the overflow line is disposed on the flow medium side downstream of a last economizer heating surface, and
    wherein a throughflow valve for the flow medium is disposed on the flow medium side downstream of the branching-off point of the overflow line.

2. The waste heat steam generator as claimed in claim 1, wherein a throughflow measurement device for the flow medium is disposed downstream of the branching-off point of the overflow line.

3. A method for regulating a short-term power increase of a steam turbine having an upstream waste heat generator, comprising:
    forming a flow path by a plurality of economizer, evaporator and superheater heating surfaces of the waste heat generator through which a flow medium flows;
    branching off the flow medium by an overflow line from the flow path on a flow medium side upstream of an evaporator heating surface and downstream of an economizer heating surface; and
    injecting the flow medium into the flow path on the flow medium side downstream of a superheater heating surface,
    wherein the flow medium is branched off on the flow medium side downstream of a last economizer heating surface, and
    wherein a throughflow valve for the flow medium is disposed on the flow medium side downstream of a branching point of the overflow line for regulating a throughflow of the flow medium.

4. The method as claimed in claim 3, wherein a throughflow of the flow medium on the flow medium side is measured downstream of a branching-off point of the overflow line.

* * * * *